United States Patent [19]

Vonk et al.

[11] Patent Number: 4,876,130
[45] Date of Patent: Oct. 24, 1989

[54] BITUMINOUS COMPOSITION AND USE THEREOF AS COLD-APPLICABLE SELF-ADHESIVE COMPOUND

[75] Inventors: Willem C. Vonk; Gerrit van Gooswilligen, both of CM Amsterdam, Netherlands

[73] Assignee: Shell Oil Company, Houston, Tex.

[21] Appl. No.: 899,856

[22] Filed: Aug. 25, 1986

[30] Foreign Application Priority Data

Mar. 20, 1986 [GB] United Kingdom ............... 8606903

[51] Int. Cl.$^4$ ................. B32B 11/02; B32B 11/10; B32B 27/20; C08L 95/00
[52] U.S. Cl. ........................ 428/40; 106/269; 106/278; 106/281.1; 106/DIG. 7; 428/241; 428/286; 428/291; 428/489; 524/62; 524/68
[58] Field of Search .............. 106/269, 278, 281.1, 106/DIG. 7; 428/40, 241, 286, 291, 489; 524/62, 68

[56] References Cited

U.S. PATENT DOCUMENTS

| 4,332,703 | 6/1982 | Lijzenga et al. | 524/68 |
| 4,443,570 | 4/1984 | Draper et al. | 524/62 |
| 4,478,912 | 10/1984 | Uffner et al. | 428/349 |

FOREIGN PATENT DOCUMENTS

| 0037136 | 10/1981 | European Pat. Off. |
| 0085683 | 9/1976 | Poland . |
| 1422123 | 1/1976 | United Kingdom . |
| 1538266 | 1/1979 | United Kingdom . |

Primary Examiner—James C. Cannon

[57] ABSTRACT

A bituminous composition comprising:
(a) from 99 to 85% w of a mixture of:
 (1) 45 to 99.8% w of a bituminous component having a penetration of at least 800 dmm at 25° C.;
 (2) 0.1 to 30% w of a lithium salt of a $C_{10-40}$ fatty acid or hydroxy fatty acid;
 (3) 0.1 to 25% w of an elastomer; and
(b) from 1 to 15% w of an amorphous silica filler.

10 Claims, No Drawings

BITUMINOUS COMPOSITION AND USE THEREOF AS COLD-APPLICABLE SELF-ADHESIVE COMPOUND

BACKGROUND OF THE INVENTION

The present invention relates to a bituminous composition and its use as cold-applicable self-adhesive compound.

From European Patent Specification No. 37136 a bituminous composition is known which contains a bituminous component having a penetration at 25° C. of less than 800 dmm, a lithium salt of a $C_{10-40}$ fatty or hydroxy fatty acid, an elastomer and a filler. This composition has good adhesive properties. The bituminous component in this composition is rather hard. This ensures that the composition does not flow. The hardness of the bituminous component, however, has also an effect on the ease of applicability of the composition on structures, and it thwarts a proper contact between the composition and rough surfaces. To facilitate the applicability, and to improve the contact as referred to a solvent is added to the composition. This solvent evaporates after application and an adhesive compound is obtained. Apart from the fact that the evaporation of the solvent adds to the costs of the product, it is to be remarked that from an environmental and health point of view the evaporation of solvents like benzene, toluene, and halogenated hydrocarbons, is undesirable. So there is a need for bituminous compositions which are more easily applicable on structures while retaining the favorable properties of the composition according to the above European patent.

The use of a softer bituminous component would improve the handleability. However, it is also to be expected that the softer bituminous component would render the composition more sensitive to flow. It has now been found that a bituminous composition can be obtained which contains a soft bituminous component, which has a good tack, even on wet or dusty surfaces, which can be applied on structures while it is cold, and which has a high resistance to flow. The invention therefore relates to a bituminous composition comprising:

(a) from 99 to 85%w of a mixture of:
  (1) 45 to 99.8%w of a bituminous component having a penetration of at least 800 dmm at 25° C.;
  (2) 0.1 to 30%w of a lithium salt of a $C_{10-40}$ fatty acid or hydroxy fatty acid;
  (3) 0.1 to 25%w of an elastomer; and
(b) from 1 to 15%w of an amorphous silica filler.

Due to the selection of the amorphous silica filler the resistance to flow of the composition is extremely high. The composition has a sufficiently low modulus to ensure an excellent contact between the composition and any surface. Further, there is an excellent tack to structures which make the composition very suitable for use as a cold-applicable self-adhesive compound.

The bituminous component present in the bituminous compositions according to the present invention may be a naturally occurring bitumen or derived from a mineral oil. Also, petroleum pitches obtained by a cracking process and coal tar can be used as the bituminous component as well as blends of various bituminous materials. Examples of suitable components include distillations or "straight-run bitumens", precipitation bitumens, e.g. propane bitumens, blown bitumens and mixtures thereof. Other suitable bituminous components include mixtures of one or more of these bitumens with extenders (fluxes) such as petroleum extracts, e.g. aromatic extracts, distillates or residues. Suitable bituminous components (either "straight-run bitumens" or "fluxed bitumens") are those having a penetration of at least 800 dmm at 25° C. The person skilled in the art usually characterizes such bituminous components not by their penetration values but by their viscosities, determined according to ASTM D 2171. A penetration of 800 dmm at 25° C. corresponds to a viscosity according to ASTM D 2171 of about 10,000 poise (1000 Pa.s). Preferably, the bituminous component has a viscosity as defined above of at least 1000 poise (100 Pa.s), in particular of between 2000 and 8000 poise (200–800 Pa.s). The amount of bituminous component to be used in the bituminous compositions is preferably between 75 and 99.5%w calculated on mixtures containing 99–85%w of the ingredients 1, 2 and 3.

The bituminous composition according to the invention contains an elastomer. Elastomers are generally associated with polymers of dienes, such as butadiene or isoprene, or with copolymers of such dienes with a vinylaromatic compound, such as styrene. It is emphasized that the elastomer used in the composition of the invention is not restricted to such polymers or copolymers. Suitable elastomers include polyesters, polyacrylates, polysulfides, polysilicones and polyesteramides, provided they show an elastomer behavior. Preferably, the elastomer used is indeed a block copolymer or hydrogenated block copolymer of a monovinyl aromatic hydrocarbon or a 1-alkene and a conjugated diene. Suitable dienes are dienes with from 4 to 8 carbon atoms per monomer, in particular butadiene and isoprene. Suitable monovinyl aromatic hydrocarbons are αmethyl styrene, vinyl toluene, vinyl xylene, and in particular styrene. The 1-alkenes used are preferably 1-alkenes having from 2 to 12 carbon atoms per monomer, such as ethylene, propene, 1-butene, 1-hexene, 1-octene. The block copolymer may be linear having the configuration.

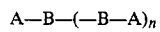

A—B—(—B—A)$_n$ in which A represents a polyvinyl aromatic or poly-1-alkene block, B represents a polydiene block and n represents an integer ranging from 1 to 5. Suitably n is 1, yielding a three-block copolymer of the configuration A—B—A. The block-copolymer may also be branched or star-shaped having the configuration A—B——(-B—A)$_m$ in which m represents an integer from 2 to 8 and A and B have the above meanings. The amount of polymer blocks A in the block copolymer suitably ranges from 10 to 70, more preferably from 20 to 50%w.

The polymer blocks A advantageously have a number average molecular weight in the range from 2,000 to 100,000, in particular from 5,000 to 50,000. The polymer blocks B preferably have a number average molecular weight in the range of from 25,000 to 1,000,000, particularly from 30,000 to 150,000.

The preparation of the block copolymer is known in the art. In the above-mentioned British Patent Specification No. 1,538,266 a number of methods are described. For the preparation of star-shaped copolymers use can be made of suitable coupling agents such as adipates or silicon-compounds or a nucleus prepared by oligomerization of di- or tri-vinyl benzene. Other coupling agents can be selected from polyepoxides, such as epoxidized linseed oil, polyisocyanates, e.g. benzo-1,2,4-triisocyanate, polyketones e.g. hexane-1,3,6-trione, polyanhydrides or polyhalides. The hydrogenation of the block copolymer, if desired, may be carried out as described in the above British Patent Specification.

The block copolymer may be hydrogenated, if desired, by any suitable technique. The hydrogenation may be complete or partial. It is possible to selectively hydrogenate just the non-aromatic unsaturation so as to convert, e.g. a polyisoprene block to an ethylene propylene rubber (EPR) block. It is also possible to use mixtures of two or more elastomers.

It is observed that some commercial elastomers may be in admixture with various extender oils and these compositions may also be used as a component of the self-adhesives. Any extender oil present is regarded as a part of the bituminous component insofar as the percentage by weight of the components of the present invention are concerned. The composition may contain up to 25%w of an elastomer. The preferred amount of elastomer present in the compositions according to the invention is from 1–18%w as those compositions have the most pronounced plastic properties.

The third essential component in the bituminous compositions according to the present invention comprises a lithium salt of a $C_{10-40}$ (hydroxy) fatty acid. Preferred are the lithium salts of (hydroxy) fatty acids having 12–22 carbon atoms. Good results can be obtained by using lithium stearate, lithium hydroxystearate, lithium palmitate and lithium hydroxy palmitate, the former two compounds being preferred. Lithium salts of unsaturated fatty acids may also be suitably applied as well as mixtures of various lithium salts of (hydroxy) fatty acids. The amount of lithium salt(s) to be applied is preferably in the range of from 2–15%w, calculated on mixture containing 99–85%w of the ingredients 1, 2 and 3.

The filler in the compositions according to the invention is amorphous silica. It has been found that these fillers effectively counteract the flow behavior shown by the soft bituminous component used. The amorphous silica filler includes i.a. dry silica gels, precipitated silica and fumed (pyrogenic) silica. The preparation of dry silica gel is known in the art and basically resides in mixing a metal silicate with an acidic aqueous medium to form a hydrosol, aging the sol to get a hydrogel and subsequently drying the hydrogel to obtain dry silica gel (xerogel). Precipitated silicas are obtained by coagulation of silica particles under the influence of a high salt concentration or other coagulants. Fumed silica (pyrogenic silica or aerosil) can i.a. be produced by vapor-phase hydrolysis of silicon tetrahalides, vaporization of silica (such as sand) in the presence of a reducing agent to produce SiO and subsequent oxidation thereof, and vaporization of $SiO_2$ and subsequent cooling whereby amorphous silica particles form. Fumed silicas are of high purity and are preferred in the composition according to the present invention.

The known composition according to European Patent No. 37,136 may contain from 0 to 70%w of the filler; however, it is preferred that the composition, to be suitable as an adhesive compound contain from 15 to 60, or even more preferably from 25 to 50%w of a filler. The present composition may contain considerably less filler than the preferred known composition, that is, from 1 to 15%w filler. The most suitable amount of filler can be determined by those persons skilled in the art. It would seem that the specific surface area of the amorphous silica plays a role to the extent that the higher the surface area, the less silica filler is required. Preferably, the surface area of the amorphous silica ranges from 50–700 $m^2$/gr, in particular 100–400 $m^2$/gr.

The compositions according to the invention may be prepared by various methods like those described in European Patent Specification No. 37,136.

As stated hereinbefore the bituminous compositions according to the invention are extremely suitable as cold-applicable self-adhesive compounds. If the compounds is to be applied in cold conditions, it may be useful to add a minor amount of high-boiling diluent to the composition. Suitable diluents have a boiling point of at least 200° C. and include aliphatic hydrocarbons having such a high boiling point and $C_{1-6}$ ether of diglycols and polyglycols.

The composition according to the above European Patent is a suitable adhesive and can be used by applying a layer of this composition on a structure followed by application of a protective sheet, such as a roofing felt, on this layer, thereby gluing the sheet to the structure. This composition is generally not fit for use in a preformed adhesive layer attached to the sheet. It is evident that it would be advantageous if compositions were available which could be used as a preformed self-adhesive layer on a protective sheet, such as a roofing felt. The present invention provides such a composition. Hence, the invention also relates to a protective membrane which membrane contains a layer of protective material and an adhesive layer of the composition according to the present invention. The membrane may further contain a release paper attached to the adhesive layer, thereby enabling the membrane to be rolled up to facilitate storage and transport. The protective material includes rubber sheets, metal foils, such as aluminum foils, heat or sound insulation panels and roofing felt. Roofing felts are known in the art and may comprise a hard, e.g. blown, bitumen, fibers as reinforcements, aggregates and/or polymers. The adhesive compound has a good tack and no flow whereas it is very good resistance against water. This latter feature shows not only by a good tack after a structure coated with a sheet of material by means of the present composition, is subjected to water, e.g. by immersion, but also by the adherability to wet(ted) and/or dusty surfaces.

Other uses of the composition according to the invention include the use as an adhesive for various types of structures and as pipe wrapping.

The invention will be illustrated by means of the following Example.

EXAMPLE

A bituminous component A was prepared from propane bitumen and bright stock furfural extract.

Bituminous component A consisted of 30%w of propane bitumen and 70%w of bright stock furfural extract, and had a viscosity of 3000 P (300 Pa.s) according to ASTM D 2171.

An elastomer B was used, being a styrene-isoprene-styrene block copolymer having an average number molecular weight of 10,000-140,000-10,000.

Fumed amorphous silica, commercially available under trade name Aerosil 300, having a BET surface area of about 300 $m^2$/g was used.

Two compositions, I and II, were prepared and these were subjected to the following tests:

Resistance to flow: a layer, 1 mm thick, of said inventive composition was applied on a 3 mm thick polymer-containing bituminous roofing felt and the membrane obtained was applied on a cement concrete sample, which was placed for 24 hours vertically at 80° C. After this period the displacement (flow) was determined and expressed in mm.

Peel strength: a layer 1 mm thick and 2 cm wide of said inventive composition was applied on a metal specimen. The peel strength was determined at room temperature initially after application of the composition onto the specimen at room temperature and also after immersion of a specimen thus obtained in water, also at ambient temperature, for 24 hours. Moreover, the peel strength was determined at 5° C. initially after application at 5° C. The peeling was carried out at an angle of 90° and at a rate of 20 mm/min. The peel strength is expressed as N/2 cm.

The compositions of the various test compounds and the results are indicated in the Table.

TABLE

| Composition | I | II |
|---|---|---|
| Bitumen component A, %w | B, 80 | B, 84 |
| Elastomer B, %w | D, 10 | D, 10 |
| Lithium Stearate, %w | 4 | 6 |
| Fumed silica, %w | 6 | — |
| Flow Resistance, mm | 0 | >10 |
| Peel strength, N/2cm | | |
| initially, room temp. | 20 | 19 |
| 24h, H$_2$O, room temp. | 11 | 12 |
| initially, 5° C. | 11 | 8 |

From above results it appears that composition I has a considerably better flow resistance than composition II, and that the peel strength of composition I is at least similar to that of composition II. In comparing the test results of compositions I and II, it appears that lithium stearate alone cannot prevent the composition from flowing, (while lithium stearate is a known thickener) whereas the addition of fumed silica stops the composition from flowing completely.

What is claimed is:
1. A bituminous composition comprising:
   (a) from 99 to 85%w of a mixture of:
      (1) 45 to 99.8%w of a bituminous component having a penetration of at least 800 dmm and a viscosity within the range of 2000 to 8000 poise as determined by ASTM D 2171;
      (2) 0.1 to 30%w of a lithium salt of a C$_{10-40}$ fatty acid or hydroxy fatty acid;
      (3) 0.1 to 25%w of an elastomer; and
   (b) from 1 to 15%w of an amorphous silica filler.
2. The bituminous composition according to claim 1, in which the silica filler is fumed silica.
3. The bituminous composition according to claim 1, in which the amorphous silica filler has a surface area within the range of 100 to 400 m$^2$/gr.
4. The bituminous composition according to claim 1 in which the lithium salt is the lithium salt of stearic acid or hydroxystearic acid.
5. The bituminous composition according to claim 1, in which the elastomer is a member of the group comprising block copolymer and conjugated diene, a hydrogenated block copolymer of a monovinylaromatic hydrocarbon and a conjugated diene, and a 1-alkene and a conjugated diene.
6. A bituminous composition according to claim 5, wherein the monovinylaromatic hydrocarbon is styrene and the conjugated diene is butadiene or isoprene.
7. A protective membrane which contains a layer of protective material and an adhesive layer of the composition according to claim 1.
8. The protective membrane according to claim 7, which contains a release paper attached to the adhesive layer.
9. The protective membrane according to claim 7 in which the layer of protective material is roofing felt.
10. A bituminous composition comprising:
   (a) about 94%w of a mixture of:
      (1) about 80%w of a bituminous component having a penetration of at least 800 dm at 25° C.;
      (2) about 4%w of lithium stearate;
      (3) about 10%w of an elastomer; and
   (b) about 6%w of a fumed silica filler.

* * * * *